US009820270B2

(12) United States Patent
Li et al.

(10) Patent No.: US 9,820,270 B2
(45) Date of Patent: *Nov. 14, 2017

(54) METHOD AND APPARATUS FOR CONFIGURING SEARCH SPACE OF A DOWNLINK CONTROL CHANNEL

(71) Applicant: Samsung Electronics Co., Ltd., Suwon-si, Gyeonggi-do (KR)

(72) Inventors: Yingyang Li, Beijing (CN); Chengjun Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/858,613

(22) Filed: Sep. 18, 2015

(65) Prior Publication Data

US 2016/0014731 A1    Jan. 14, 2016

Related U.S. Application Data

(63) Continuation of application No. 13/835,473, filed on Mar. 15, 2013, now Pat. No. 9,155,091.

(30) Foreign Application Priority Data

Mar. 19, 2012  (CN) .......................... 2012 1 0072997
Sep. 4, 2012   (CN) .......................... 2012 1 0323726

(51) Int. Cl.
*H04W 72/04* (2009.01)
*H04L 5/00* (2006.01)
*H04L 1/00* (2006.01)

(52) U.S. Cl.
CPC ......... *H04W 72/042* (2013.01); *H04L 5/0053* (2013.01); *H04L 5/0064* (2013.01); *H04L 1/0045* (2013.01); *H04W 72/0446* (2013.01)

(58) Field of Classification Search
CPC ... H04W 72/042; H04L 5/0053; H04L 5/0064
See application file for complete search history.

(56) References Cited

U.S. PATENT DOCUMENTS

| 8,537,862 | B2 | 9/2013 | Blankenship et al. |
| 8,687,579 | B2 | 4/2014 | Wu et al. |

(Continued)

FOREIGN PATENT DOCUMENTS

| CN | 101848483 A | 9/2010 |
| WO | 2011/160589 A1 | 12/2011 |
| WO | 2012/029244 A1 | 3/2012 |

OTHER PUBLICATIONS

Qualcomm Incorporated, 'Search space design for e-PDCCH', R1-114125, Nov. 14-18, 2011, 3GPP TSG RAN WG1 #67, San Francisco, CA, USA.

(Continued)

*Primary Examiner* — Rasheed Gidado
(74) *Attorney, Agent, or Firm* — Jefferson IP Law, LLP

(57) ABSTRACT

A method for configuring a search space of a downlink control channel is provided. The method includes determining the parameters for Enhanced Physical Downlink Control Channel (E-PDCCH) candidates of each aggregate level according to the number of Resource Elements (RE) in a subframe and/or the number of bits of Downlink Control Information (DCI) formats, when the parameters for E-PDCCH candidates of E-PDCCH search space is configured, determining, by a User Equipment (UE), the parameters for E-PDCCH candidates according to a current downlink subframe and a detected DCI format, and detecting blindly, by the UE, the E-PDCCH candidates in the E-PDCCH search space corresponding to the parameters for E-PDCCH candidates. The present invention also provides a UE and a base station. Application of the present invention can improve the (Continued)

flexibility of the base station scheduling, and reduce the possibility that the E-PDCCHs of different UEs block each other.

28 Claims, 6 Drawing Sheets

(56) References Cited

U.S. PATENT DOCUMENTS

| | | | |
|---|---|---|---|
| 8,755,348 B2 | 6/2014 | He et al. | |
| 2010/0279628 A1* | 11/2010 | Love | H04L 5/0091 |
| | | | 455/70 |
| 2011/0268062 A1 | 11/2011 | Ji et al. | |
| 2011/0317615 A1 | 12/2011 | Soong et al. | |
| 2012/0106465 A1* | 5/2012 | Haghighat | H04W 72/1289 |
| | | | 370/329 |
| 2013/0039284 A1* | 2/2013 | Marinier | H04L 5/001 |
| | | | 370/329 |
| 2013/0044664 A1* | 2/2013 | Nory | H04L 1/0045 |
| | | | 370/311 |
| 2013/0044692 A1 | 2/2013 | Nory et al. | |
| 2013/0044727 A1 | 2/2013 | Nory et al. | |
| 2013/0058285 A1 | 3/2013 | Koivisto et al. | |
| 2013/0064196 A1 | 3/2013 | Gao et al. | |
| 2013/0114529 A1 | 5/2013 | Chen et al. | |
| 2013/0114565 A1 | 5/2013 | Chen et al. | |
| 2013/0163551 A1 | 6/2013 | He et al. | |
| 2013/0182664 A1 | 7/2013 | Chen et al. | |
| 2013/0188577 A1* | 7/2013 | Papasakellariou | H04W 72/04 |
| | | | 370/329 |
| 2013/0194931 A1* | 8/2013 | Lee | H04L 5/0053 |
| | | | 370/241 |
| 2013/0223366 A1* | 8/2013 | Papasakellariou | H04W 72/042 |
| | | | 370/329 |

OTHER PUBLICATIONS

Samsung, 'Search Space Design for E-PDCCHs', R1-120190, Feb. 6-10, 2012, 3GPP TSG RAN WG1 #68, Dresden, Germany.

Huawei et al: "UE-specific search space for ePDCCH", 3GPP Draft; R1-120998, 3rd Generation Partnership Project (3GPP), Mobile Competence Centre, vol. RAN WG1, Mar. 20, 2012, pp. 1-5, XP050599309, Sophia-Antipolis Cedex; France.

Ericsson et al: "On aggregation levels for ePDCCH", 3GPP Draft; R1-122002 on Aggregation Levels for ePDCCH, 3rd Generation Partnership Project (3GPP), Mobile Competence Centre, vol. RAN WG1, May 12, 2012, pp. 1-2, XP050600294, Sophia-Antipolis Cedex; France.

Mediatek Inc: "eCCE Aggregation Level and Complexity Analysis", 3GPP Draft; R1-123339 eCCE Aggregation Level and Complexity Analysis (Final), 3rd Generation Partnership Project (3GPP), Mobile Competence Centre vol. RAN WG1, No. Qingdao, China; Aug. 13, 2012-Aug. 17, 2012 Aug. 5, 2012, XP050661223, Sophia-Antipolis Cedex; France.

Samsung: "Localized Operation and Search Space Design of eCCHs", 3GPP Draft; R1-122254 LEPDCCH Operation, 3rd Generation Partnership Project (3GPP), Mobile Competence Centre, vol. RAN WG1, May 12, 2012, XP050600518, Sophia-Antipolis Cedex; France.

NTT Docomo: "Performance Evaluation of Search Space for ePDCCH", 3GPP Draft; R1-123552—Performance Evaluation of Search Space for ePDCCH, 3rd Generation Partnership Project (3GPP), Mobile Competence Centre, vol. RAN WG1, No. Qingdao, China; Aug. 13, 2012-Aug. 17, 2012, Aug. 5, 2012, XP050661430, Sophia-Antipolis Cedex; France.

ZTE: "Discussion on ePDCCH candidates and search space design", 3GPP Draft; R1-123374 Discussion on ePDCCH Candidates and Search Space Design, 3rd Generation Partnership Project (3GPP), Mobile Competence Centre, vol. RAN WG1, No. Qingdao, China; Aug. 13, 2012-Aug. 17, 2012, Aug. 5, 2012, XP050661262, Sophia-Antipolis Cedex, France.

Samsung: "ePDCCH Design and RE Mapping", 3GPP Draft; R1-123482 ePDCCH RE Map, 3rd Generation Partnership Project (3GPP), Mobile Competence Centre, vol. RAN WG1, No. Qingdao, China; Aug. 13, 2012-Aug. 17, 2012, Aug. 5, 2012, XP050661361, Sophia-Antipolis Cedex; France.

\* cited by examiner

FIG. 3
(RELATED ART)
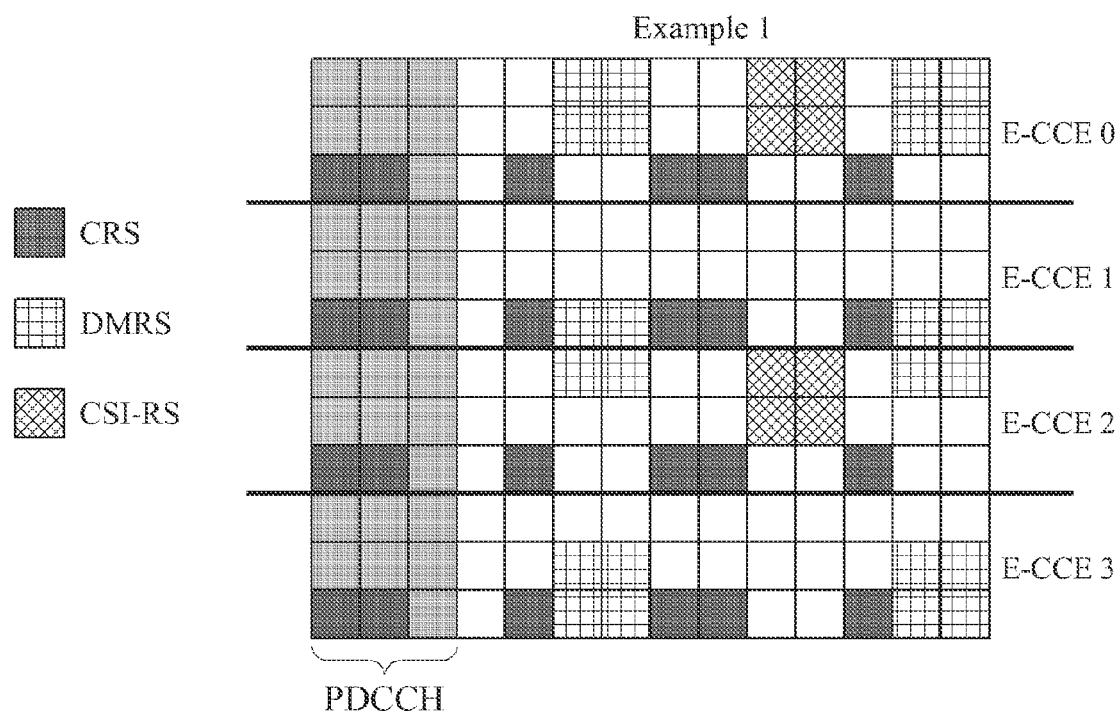
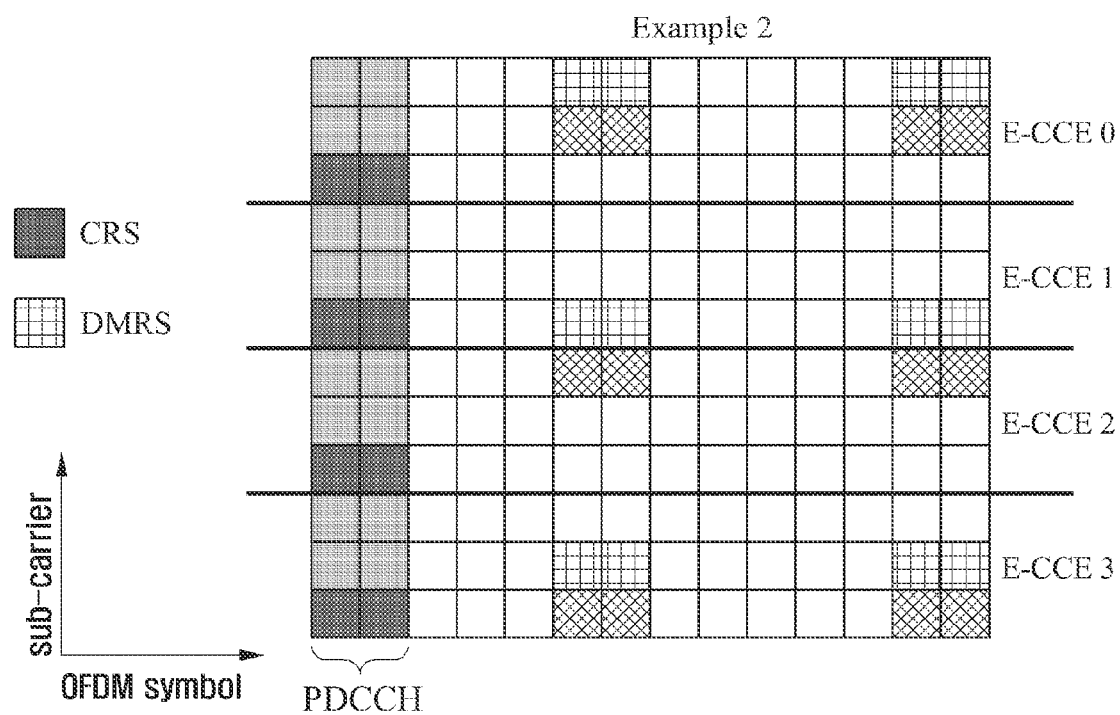

METHOD AND APPARATUS FOR CONFIGURING SEARCH SPACE OF A DOWNLINK CONTROL CHANNEL

CROSS-REFERENCE TO RELATED APPLICATION(S)

This application is a continuation application of prior application Ser. No. 13/835,473, filed on Mar. 15, 2013, which issued as U.S. Pat. No. 9,155,091 on Oct. 6, 2015, and claimed the benefit under 35 U.S.C. §119(a) of a Chinese patent application filed on Mar. 19, 2012 in the State Intellectual Property Office and assigned Serial number 201210072997.2, and of a Chinese patent application filed on Sep. 4, 2012 in the State Intellectual Property Office and assigned Serial number 201210323726.X, the entire disclosure of each of which is hereby incorporated by reference.

BACKGROUND OF THE INVENTION

1. Field of the Invention

The present invention relates to wireless communication system technology. More particularly, the present invention relates to a method and apparatus for configuring a search space of a physical downlink control channel.

2. Description of the Related Art

In a wireless communication system, downlink transmission refers to a base station's transmission of a signal to a User Equipment (UE). A downlink transmission signal includes a data signal, a control signal and a reference signal (i.e., Pilot). Herein, the base station transmits downlink data in a Physical Downlink Shared Channel (PDSCH), or transmits downlink control information in a downlink control channel. Uplink transmission refers to transmission of a signal by the UE to the base station. An uplink signal also includes a data signal, a control signal and a reference signal. Herein, the UE transmits uplink data in a Physical Uplink Shared Channel (PUSCH), or transmits uplink control information in a Physical Uplink Control Channel (PUCCH). The base station may dynamically schedule PDSCH transmission and PUSCH transmission of the UE by a Physical Downlink Control Channel (PDCCH). In a 3GPP LTE system, downlink transmission is performed using Orthogonal Frequency Division Multiple Access (OFDMA) technology, and uplink transmission is performed using Signal-Carrier Frequency Division Multiple Access (SCFDMA) technology. In the 3GPP LTE system, the length of each wireless frame, which is equally divided into 10 subframes, is 10 ms and a downlink Transmission Time Interval (TTI) is defined as one subframe FIG. 1 is a schematic diagram illustrating a subframe structure in a Long Term Evolution (LTE) system according to the related art.

Referring to FIG. 1, each downlink subframe includes two time slots. For a normal Cyclic Prefix (CP) length, each time slot contains 7 OFDM symbols; for an extended CP length, each time slot contains 6 OFDM symbols. In each subframe, the first n OFDM symbols, where n is equal to 1, 2 or 3, are used for transmitting the downlink control information including the PDCCH and other control information; the remaining OFDM symbols are used for transmitting the PDSCH.

Resource allocation is based on a Physical Resource Block (PRB), wherein one PRB contains 12 consecutive sub-carriers in the frequency domain and corresponds to one time slot in the time domain. Two PRBs in two time slots of the same sub-carrier in one subframe constitute a PRB pair.

In each PRB pair, a Resource Element (RE) is a minimal unit of time and frequency resource. That is, the RE contains one sub-carrier in the frequency domain and contains one OFDM symbol in the time domain. REs may be respectively used for different functionalities. For example, some of the REs may be used respectively for transmitting a Cell specific Reference Signal (CRS), a user specific Demodulation Reference Signal (DMRS), a Channel State Information Reference Signal (CSI-RS) etc.

In the LTE system, multiple data transmission modes are defined. For example, in the downlink direction, the data transmission modes include a closed loop Multiple Input Multiple Output (MIMO) transmission mode, an open loop MIMO transmission mode, a transmitting diversity transmission mode etc. In the uplink direction, the transmission modes include a single antenna transmitting mode, a MIMO mode, etc. For one transmission mode, the system configures a normal Downlink Control Information (DCI) format used for normal data transmission in the transmission mode. At the same time, the base station configures the UE to check a fallback DCI format having a small number of bits and that is used for scheduling data in a conservative manner, e.g., transmitting diversity or data transmission through a single antenna, thereby having high reliability. In addition, DCI formats of the uplink transmission and the downlink transmission are different. That is, in one TTI, the UE needs to detect multiple possible DCI formats.

In the LTE system, DCI transmitted to different UEs or DCI of different functionalities is coded independently and transmitted. When the PDCCH is mapped to physical resources, a Control Channel Element (CCE) is taken as a unit, i.e., one PDCCH modulation symbol may be mapped to L CCEs where L is equal to 1, 2, 4, or 8, and L is also called a PDCCH aggregate level. Each CCE contains 36 REs. Since the PDCCH uses Quad-Phase Shift Keying (QPSK) as a modulation method, the base station may select the aggregate level of the CCE for transmitting the PDCCH according to the number of bits of the control information and the UE's link condition.

Herein, if each UE is configured with a unique PDCCH, when the quantity of UEs exceeds the quantity of PDCCHs, a problem is caused that the PDCCHs of the UEs block each other. Otherwise, if all of the PDCCHs may be allowed to be configured to all of the UEs, the UEs need to be configured to detect all of the possible PDCCHs. As a consequence, the UE's complexity is increased and a false alarm rate is caused to be increased. Thus, in the LTE system, the UE is configured to detect the PDCCH at multiple possible locations, which are called a UE search space. The base station transmits the PDCCH on one of the multiple possible locations configured for UE detection. By blindly detecting the multiple locations configured by the base station, the UE may obtain the control information transmitted by the base station on one of the locations. In the LTE system, the UE needs to detect the PDCCH respectively in a cell Common Search Space (CSS) and a UE specific Search Space (USS). Herein, the PDCCH in the CCS is usually used for scheduling system broadcast information etc., and the PDCCH in the USS is usually used for dynamically scheduling the PDSCH and PUSCH of the UE.

According to the above description, the UE needs to detect the CSS and the USS respectively, and in each search space, the UE needs to detect multiple possible DCI formats. In the LTE system, the number of PDCCH candidates corresponding to each aggregate level for each type of the DCI formats is defined, as shown in Table 1. Herein, for the same search space, the number of PDCCH candidates needing to be detected for various DCI formats are the same.

TABLE 1

| Search Space $S^{(L)}$ | | The number of the PDCCH candidates $M^{(L)}$ |
|---|---|---|
| Type | Aggregate Level $L$ | |
| UE specific | 1 | 6 |
| | 2 | 6 |
| | 4 | 2 |
| | 8 | 2 |
| Cell common | 4 | 4 |
| | 8 | 2 |

According to Table 1, when the aggregate level is 1, the number of the aggregate PDCCHs is 6. Thus, the UE needs to blindly detect the PDCCH on 6 possible locations.

In an enhanced version of LTE, the PDCCH may become a system performance bottleneck since it must support multi-cell joint transmission or a heterogeneous network. In order to support greater capacity of the control channel, and to support interference collaboration of control channels of multiple cells, an enhanced PDCCH (E-PDCCH) is proposed.

FIG. 2 is a schematic diagram illustrating an existing multiplexing method of an E-PDCCH according to the related art.

Referring to FIG. 2, the E-PDCCH is mapped to a data region of the subframe and multiplexed with the PDSCH by using Frequency Division Multiplexing (FDM).

As shown in FIG. 2, it is assumed that the E-PDCCH is started from the OFDM symbol that is adjacent to the PDCCH (actually the E-PDCCH may alternatively be fixedly started from one OFDM symbol configured by a high layer), and the E-PDCCH occupies a certain number of OFDM symbols. The base station may notify the UE of the PRB pair used for transmitting the E-PDCCH by a higher layer signal which may be cell specific or may be specially transmitted to each UE respectively, and for different UEs, the PRB pairs used for the E-PDCCH may be different.

According to a method for mapping E-PDCCH resources, the E-PDCCH may be divided into a localized E-PDCCH and a distributed E-PDCCH. When the accurate Channel Quality Indication (CQI) of different frequency sub-bands of the UE can be obtained, the base station may choose to transmit the E-PDCCH in a suitable PRB pair to obtain frequency scheduling gain, i.e., the localized E-PDCCH. Accordingly, when the accurate CQI of the UE is not obtained, the base station has to transmit the E-PDCCH in multiple PRB pairs to obtain frequency distribution gain, i.e., the distributed E-PDCCH. The distributed E-PDCCH may also be used in a condition that the E-PDCCH needs to be transmitted to multiple UEs.

The E-PDCCH is also composed of Enhanced-CCEs (E-CCEs), which correspond to the CCEs that constitute the PDCCH. The UE also needs to detect one or multiple E-PDCCH candidates in a certain search space corresponding to the search space of the PDCCH.

In each PRB pair, the number of REs that may be practically used for transmitting the E-PDCCH is variable and relies on multiple situations such as:
 a. the number of OFDM symbols in a backward compatible control area, i.e., the number of the OFDM symbols occupied by the downlink control information;
 b. the number of REs occupied by the CRS that is transmitted in the PDSCH area for the normal subframe but is not transmitted in the PDSCH area for a Multicast Broadcast Single Frequency Network (MBSFN) subframe;
 c. the number of REs used for the DMRS; and
 d. whether the CSI-RS is transmitted, etc.

The variation of the available REs in the PRB pair causes variation in the size of the E-CCE. The variation range of the number of REs of the E-CCE may be reduced by adjusting the number of the divided E-CCEs according to the number of available REs, but this cannot thoroughly avoid the variation of the number of REs.

FIG. 3 is a schematic diagram illustrating methods for dividing the localized E-PDCCH into E-CCEs according to the related art.

Referring to FIG. 3, it is assumed that each PRB pair is divided into 4 E-CCEs. In example 1, a backward compatible control channel occupies 3 OFDM symbols, a normal subframe structure is used, 4 CRS ports are configured, and the CSI-RS is configured. Thus, only 84 REs may be used for the E-PDCCH and each E-CCE only has 21 REs, on average. In example 2, the backward compatible control channel occupies 2 OFDM symbols, an MBSFN subframe structure is used, 4 CRS ports are configured, and no CSI-RS is configured. Thus, there may be 120 REs used for the E-PDCCH, and each E-CCE contains 30 REs, on average. It can be seen that the sizes of the E-CCE in the two examples are substantially different. Actually, according to the simple method for dividing the E-CCE by subcarriers, even in the same example, the sizes of the E-CCEs are not completely equal.

Accordingly, there is a need for a method and apparatus for configuring a search space of a downlink control channel to increase the flexibility of base station scheduling and reduce the possibility that the E-PDCCHs of different UEs block each other.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for configuring a search space of a downlink control channel to increase flexibility of base station scheduling and reduce the possibility that the E-PDCCHs of different UEs block each other.

In accordance with an aspect of the present invention, a method for configuring a search space of a downlink control channel is provided. The method includes determining parameters for Enhanced Physical Downlink Control Channel (E-PDCCH) candidates of each of aggregate levels according to the number of Resource Elements (RE) in a subframe and/or the number of bits of Downlink Control Information (DCI) formats when configuring the parameters for E-PDCCH candidates of an E-PDCCH search space, determining, by n User Equipment (UE), the parameters for E-PDCCH candidates according to a current downlink subframe and a detected DCI format, and detecting blindly, by the UE, the E-PDCCH candidates in the E-PDCCH search space corresponding to the parameters for E-PDCCH candidates.

In an exemplary implementation, at least two sets of parameters for E-PDCCH candidates are configured respectively for the aggregate levels.

In an exemplary implementation, different parameters for E-PDCCH candidates are configured for different subframes according to the number of REs available for the E-PDCCH in each of the subframes, and the same parameters for E-PDCCH candidates are adopted for all of the DCI formats in the same subframe.

In an exemplary implementation, different parameters for E-PDCCH candidates are configured for different DCI formats according to the number of bits of each DCI format and the same parameters for E-PDCCH candidates are used for one DCI format in all of subframes.

In an exemplary implementation, different parameters for E-PDCCH candidates are configured for different DCI formats in different subframes according to the number of REs which may be used for the E-PDCCH in each subframe and the number of bits of each DCI format.

In an exemplary implementation, the DCI formats are grouped and the same parameters for E-PDCCH candidates are configured for each group of the DCI formats.

In an exemplary implementation, at least two sets of the parameters for E-PDCCH candidates corresponding to each aggregate level are configured according to whether the E-PDCCH of the aggregate level may carry at least one DCI format to be transmitted.

In an exemplary implementation, a single set of standard parameters for E-PDCCH candidates are configured, the workable aggregate levels are determined according to the number of REs which may be used for the E-PDCCH in the subframe, and the parameters for E-PDCCH candidates of each aggregate level are obtained by translating the standard parameters for E-PDCCH candidates.

In an exemplary implementation, the workable aggregate levels are determined for each DCI format, and the parameters for E-PDCCH candidates of each aggregate level are obtained, or the workable aggregate levels are determined uniformly for all DCI formats in each subframe, and the parameters for E-PDCCH candidates of each aggregate level are obtained.

In an exemplary implementation, a method of translating includes setting the number of the E-PDCCH candidates for the aggregate level(s) less than the minimal workable aggregate level to 0, setting the number of the E-PDCCH candidates for the minimal workable aggregate level to the first item of the numbers of the standard E-PDCCH candidates, setting the number of the E-PDCCH candidates of the second minimal workable aggregate level to the second item of the numbers of the standard E-PDCCH candidates, and so on.

In an exemplary implementation, a variation of the number of REs available for the E-PDCCH in a PRB pair influences only the number of the E-PDCCH candidates in a localized E-PDCCH search space, or a variation of the number of REs available for the E-PDCCH in a PRB pair influences the number of the E-PDCCH candidates both in a localized E-PDCCH search space and that in a distributed E-PDCCH search space.

In accordance with another aspect of the present invention, a user equipment is provided. The user equipment includes a parameter selection module and a blind detection module, wherein the parameter selection module is adapted to determine the parameters for E-PDCCH candidates according to a current downlink subframe and a detected DCI format, and the blind detection module is adapted to blindly detect an E-PDCCH in an E-PDCCH search space corresponding to the parameters for E-PDCCH candidates determined by the parameter selection module.

In accordance with another aspect of the present invention, a base station is provided. The base station includes a parameter selection module and a sending module, wherein the parameter selection module is adapted to determine the parameters for E-PDCCH candidates according to a current downlink subframe and a detected DCI format, and the sending module is adapted to select an E-PDCCH candidate in an E-PDCCH search space corresponding to the parameters for E-PDCCH candidates selected by the parameter selection module, and to send downlink control information.

It can be seen from the above technical solution for configuring the search space for the downlink control channel provided by exemplary embodiments of the present invention, when the parameters for E-PDCCH candidates of the E-PDCCH search space are configured, the parameters for E-PDCCH candidates of each aggregate level are determined by the number of REs which may be used for the E-PDCCH in each subframe and/or the number of bits of each DCI format, thus, different parameters for E-PDCCH candidates of E-PDCCH search space are used for different subframes and/or different DCI formats. In the subframes in which the number of REs that may be used for the E-PDCCH is small, the E-PDCCHs of some of the aggregate levels are unusable. However, by assigning the unusable E-PDCCH candidates to the other aggregate levels, the total number of the E-PDCCH candidates is guaranteed not to be changed or to be changed little. Thus, the flexibility with which the base station transmits the E-PDCCH is increased and the possibility that the E-PDCCHs of different UEs block each other is reduced.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 3 is a schematic diagram illustrating distribution of Resource Elements (REs) used for an methods for dividing the localized Enhanced-Physical Downlink Control Channel (E-PDCCH) into E-CCEs according to the related art;

Throughout the drawings, it should be noted that like reference numbers are used to depict the same or similar elements, features, and structures.

DETAILED DESCRIPTION OF EXEMPLARY EMBODIMENTS

Figure 1:
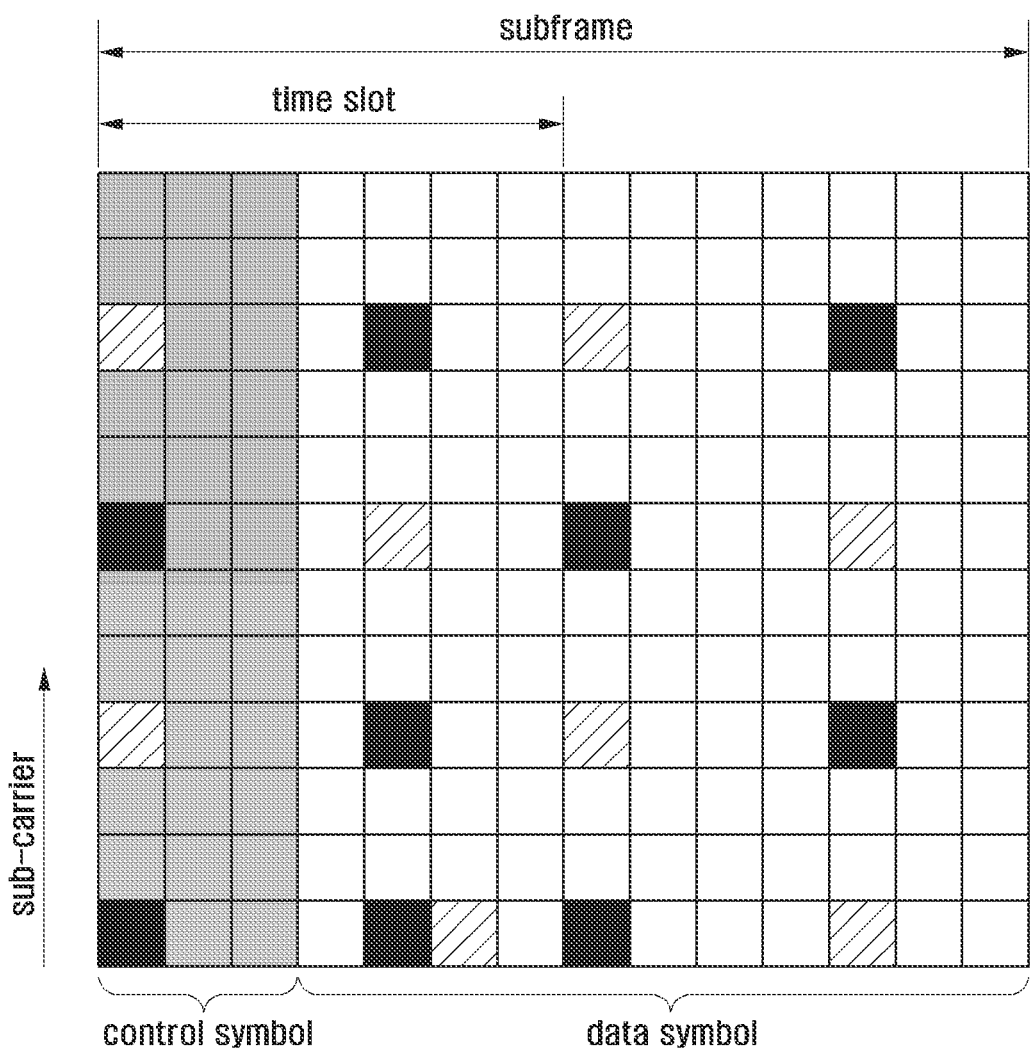
FIG. 1 is a schematic diagram illustrating a subframe structure in a Long Term Evolution (LTE) system according to the related art.
Figure 2:
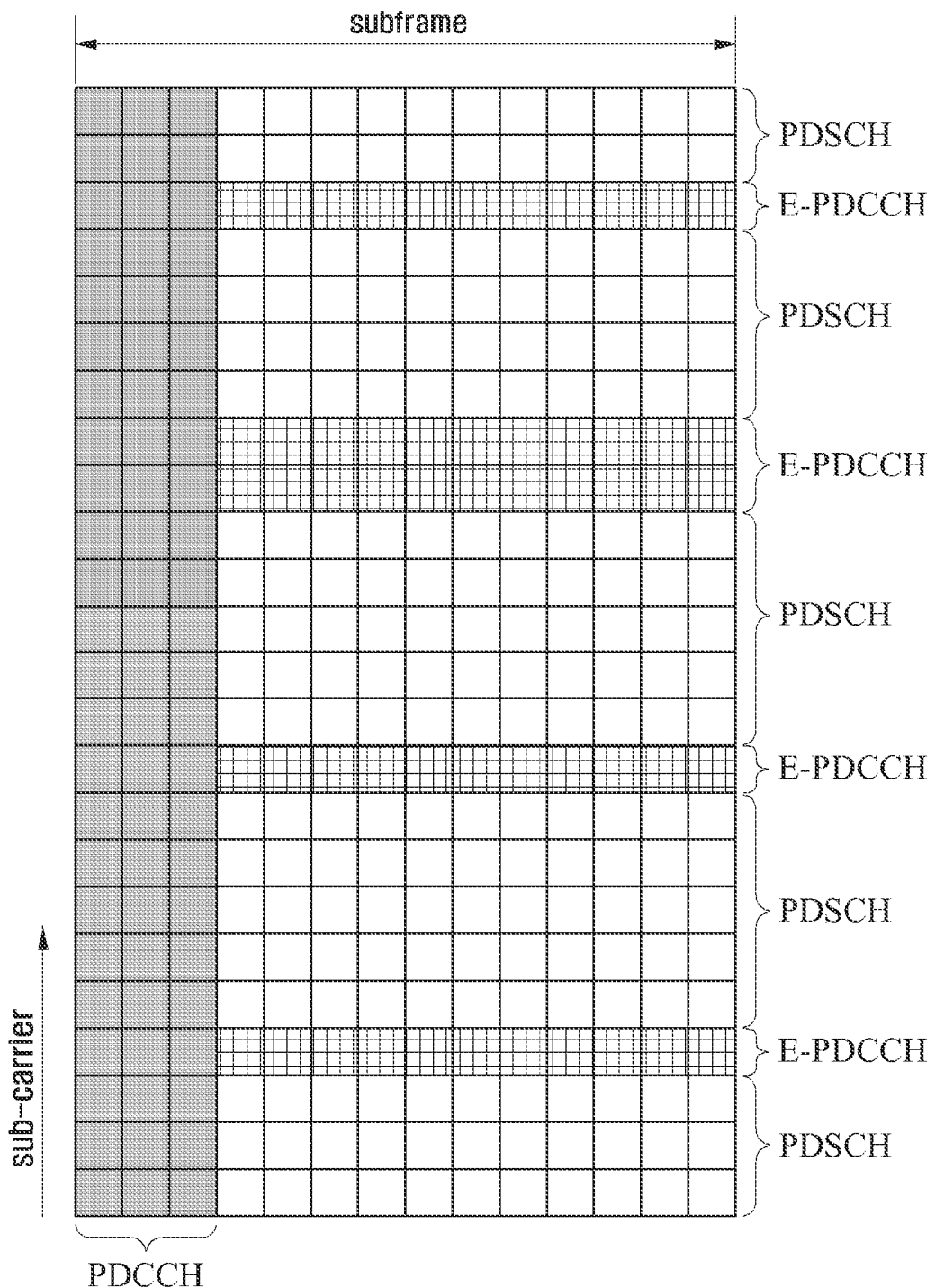
FIG. 2 is a schematic diagram illustrating an existing multiplexing method of an E-PDCCH according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For an Enhanced-Physical Downlink Control Chanel (E-PDCCH), in each Physical Resource Block (PRB) pair, the number of Resource Elements (REs) which actually may be used for transmitting the E-PDCCH is variable. Accordingly, after Enhanced-Control Chanel Elements (E-CCEs) are divided in the PRB pair, the number of REs in an E-CCE is also variable. Moreover, in different subframes, the numbers of REs which may be used for transmitting the E-PDCCH may be different. Accordingly, in the different subframes, the numbers of REs contained in the E-CCEs are different. For example, certain subframes are normal subframes, while other subframes are Multicast Broadcast Single Frequency Network (MBSFN) subframes, or Channel State Information Reference Signal (CSI-RS) is transmitted in some of the subframes.

When the number of REs of the E-CCE is very small, it may result that the E-PDCCH of a certain aggregate level is unusable. For example, the E-PDCCH containing one Enhanced-Control Channel (E-CCH) may not be used for transmitting downlink control information of a certain Downlink Control Information (DCI) format. In example 1 of FIG. 3, each E-CCH only contains 21 REs on average, while the number of bits of the DCI format may reach 50. Obviously, in a condition that the E-PDCCH uses Quad-Phase Shift Keying (QPSK) modulation, if the aggregate level is 1, it results that the coding rate of the DCI format is more than 1, may not be transmitted successfully in this E-CCH.

Since the UE needs to detect multiple DCI formats at the same time, and the numbers of bits of different DCI formats may be different, even the numbers of REs in the E-CCEs are the same, it is possible that in one E-CCH, certain DCI formats may be transmitted, but other DCI formats may not be transmitted. Since the number of usable REs of different subframes may be different, it is possible that one DCI format which is supported to be transmitted in the E-PDCCH of a certain aggregate level in some of the subframes may not be transmitted in the other subframes.

In a current configuration of a PDCCH search space, parameters of the PDCCH candidates (e.g., the number of PDCCH candidates, locations, etc.) are defined for each aggregate level respectively. That is, in each subframe, PDCCH blind detection for each DCI format is performed in the same PDCCH search space. If the method for configuring the search space is still used for the E-PDCCH, since the number of REs in some of the subframes is small, some of the aggregate levels are actually not usable for some of the DCI formats and the number of the effective E-PDCCH candidates is decreased. Thus, the flexibility with which the base station transmits the E-PDCCH is reduced and the possibility that the E-PDCCHs of different User Equipments (UEs) block each other is increased.

Based on the above analysis, exemplary embodiments of the present invention provide a method for configuring a search space of a downlink control channel.

Figure 4:
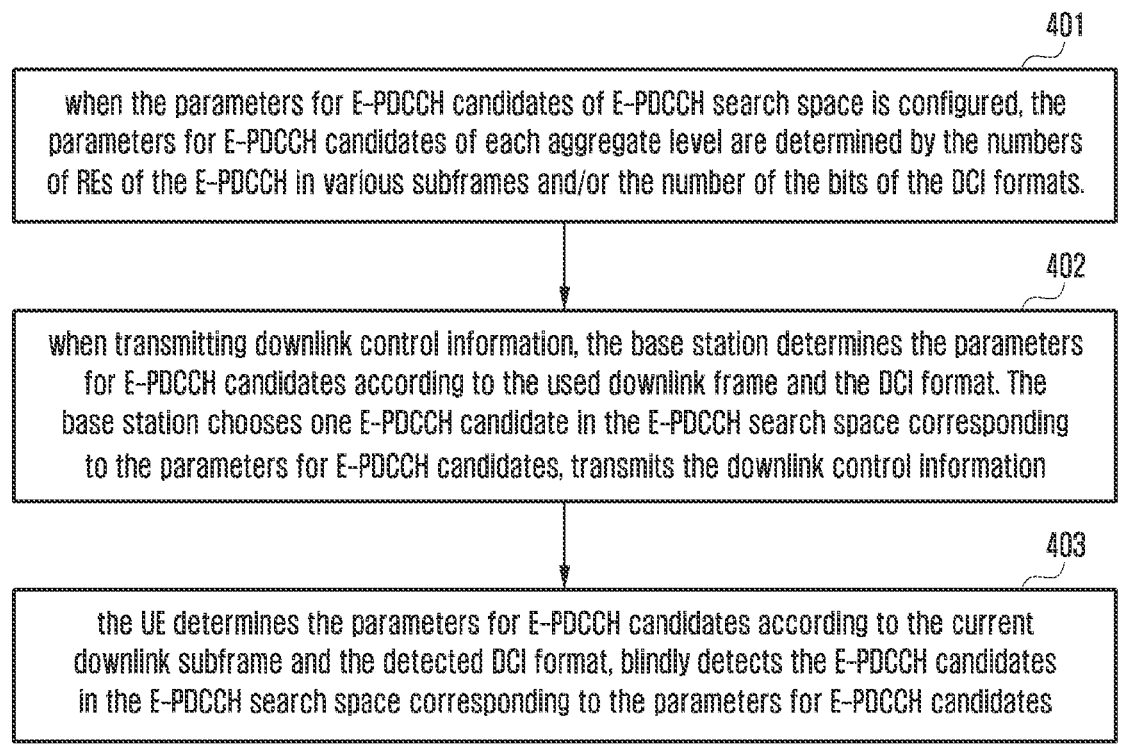
FIG. 4 is a flowchart illustrating a method for configuring a search space for a downlink control channel according to an exemplary embodiment of the present invention.

FIG. 4 is a flowchart illustrating a method for configuring a search space for a downlink control channel according to an exemplary embodiment of the present invention.

Referring to FIG. 4, when the parameters for E-PDCCH candidates of an E-PDCCH search space are configured, the parameters for E-PDCCH candidates of each aggregate level are determined by the number of REs of the E-PDCCH in various subframes and/or the number of bits of the DCI formats in step 401.

When transmitting downlink control information, the base station determines the parameters for E-PDCCH candidates according to the used downlink frame and the DCI format. The base station chooses one E-PDCCH candidate in the E-PDCCH search space corresponding to the parameters for E-PDCCH candidates and transmits the downlink control information in step 402.

In step 403, the UE determines the parameters for E-PDCCH candidates according to the current downlink subframe and the detected DCI format and blindly detects the E-PDCCH candidates in the E-PDCCH search space corresponding to the parameters for E-PDCCH candidates.

The present invention provides two exemplary methods for implementing step 401.

In a first exemplary method, when the E-PDCCH search space is configured, two sets of parameters for E-PDCCH candidates corresponding to various aggregation levels are configured and used for different subframes and/or different DCI formats. This first exemplary method may be implemented by one of the following three exemplary sub-methods.

In a first exemplary sub-method, different E-PDCCH parameters are configured for different subframes according to the numbers of REs available for the E-PDCCH in various subframes. All of the DCI formats in the same subframe use the same parameters for E-PDCCH candidates.

The first exemplary sub-method could be applied to a condition in which, in some of the subframes, the number of REs available for the E-PDCCH is sufficient, thus, the E-PDCCH for each aggregate level may carry each DCI format. In the other kind of subframes, the number of REs which may be used for the E-PDCCH is not sufficient, thus, the E-PDCCH of a certain aggregate level (e.g., the aggregate level is 1) may not carry any one of the DCI formats. The two sets of the parameters for E-PDCCH candidates may be respectively configured for the two kinds of subframes.

For example, if it is assumed that each PRB pair is divided into 4 E-CCEs, and a localized E-PDCCH is mapped in the same PRB pair (i.e., according to a tree structure), the aggregate levels of the E-PDCCH may be $L_E \in \{1,2,4\}$. A system may configure the two sets of the numbers of the E-PDCCH candidates, denoted as $M_E^{(1)} \in \{M_{E,1}^{(1)} M_{E,2}^{(1)}, M_{E,4}^{(1)}\}$ and $M_E^{(2)} \in \{M_{E,1}^{(2)} M_{E,2}^{(2)}, M_{E,4}^{(2)}\}$. Further, it may be assumed that the aggregate levels include $L_E \in \{1,2,4\}$, the number of E-PDCCH candidates is taken as an example, one set of the numbers of the E-PDCCH candidates may be set as $M_E^{(1)} \in \{4,4,2\}$ and used for the subframe in which the E-PDCCH of each aggregate level may carry each DCI format. The other set of numbers of the E-PDCCH candidates may be set as $M_E^{(2)} \in \{0,6,4\}$ and used for the subframe in which the E-PDCCH, having an aggregate level of 1, may not carry any one of the DCI formats. In the above example, when the other set of numbers of the E-PDCCH candidate are set, the unusable E-PDCCH candidates of the aggregative level 1 are respectively assigned to the aggregate levels 2 and 4 to guarantee that the total number of the E-PDCCH candidates is not changed. Alternatively, other ways may be used, as long as the total number of the E-PDCCH candidates is not changed or is changed little. For example, according to a rightward shift, the other set of numbers of the E-PDCCH candidates may be set as $M_E^{(2)} \in \{0,4,4\}$.

It can be seen that, according to the prior art, there is only one set of parameters for E-PDCCH candidates. For the subframe in which the number of REs is not enough, the E-PDCCH candidate having an aggregate level of 1 is unusable. Thus, the total number of the actual usable E-PDCCH candidates is decreased. However, in an exemplary implementation of the present invention, two sets of parameters for E-PDCCH candidates are configured. As an example, the E-PDCCH candidates, which are unusable in a certain aggregate level, are assigned to other aggregate levels to guarantee that the total number of E-PDCCH candidates is not changed or changed little. Thus, the flexibility with which the base station transmits the E-PDCCH is increased and the possibility that the E-PDCCHs of different UEs block each other is reduced.

In the exemplary sub-method, when the base station transmits the downlink information and when the UE receives the downlink control information, the set of the parameters for E-PDCCH candidates to be used is determined according to the numbers of REs available for the E-PDCCH in various subframes.

In a second exemplary sub-method, different parameters for E-PDCCH candidates are configured for different DCI formats according to the number of bits of each DCI format. The same DCI format uses the same parameters for E-PDCCH candidates in all of the subframes.

For example, it is assumed that the UE is configured with three DCI formats of which the number of bits is different with each other, which include the DCI format of downlink Multiple Input Multiple Output (MIMO), the DCI format of uplink MIMO and a fallback DCI format. The parameters for E-PDCCH candidates may be respectively defined for the above three DCI formats. Alternatively, in order to simplify operation, the DCI formats may be grouped. Different groups use different parameters for E-PDCCH candidates. For example, the DCI format of downlink MIMO and the DCI format of uplink MIMO use the same parameters for E-PDCCH candidates, while a downlink fallback DCI format and the DCI format of an uplink single antenna use the same parameters for E-PDCCH candidates.

The exemplary sub-method could be applied to the condition in which the number of REs that may be used for the E-PDCCH in all of the subframes are equal or close, according to the method for dividing the E-CCEs in the subframe. In one case, the E-PDCCH of a certain aggregate level (e.g., the aggregate level is 1) may carry one part of the DCI formats (e.g., the fallback DCI format), but in the other case, the E-PDCCH of the certain aggregate level may not carry the other DCI formats (e.g., all of the DCI formats except the fallback DCI format). Two sets of the parameters for E-PDCCH candidates may be respectively configured for the two cases. For example, the aggregate levels include $L_E \in \{1,2,4\}$. The number of the E-PDCCH candidates is taken as an example. One set of the numbers of the E-PDCCH candidates may be set as $M_E^{(1)} \in \{4,4,2\}$, used for the DCI format that may be carried by the E-PDCCH having an aggregate level of 1. The other set of the E-PDCCH candidate may be set as $M_E^{(2)} \in \{0,6,4\}$, used for the DCI format which may not be carried by the E-PDCCH having an aggregate level of 1. In the above example, when the other set of numbers of the E-PDCCH candidate is set, the unusable E-PDCCH candidates of the aggregative level 1 are assigned respectively to the aggregate levels 2 and 4 to guarantee that the total number of the E-PDCCH candidates is not changed. Alternatively, other ways may be used, as long as the total number of the E-PDCCH candidates is not changed or is changed little. For example, according to a rightward shift, the other set of the numbers of the E-PDCCH candidates are set as $M_E^{(2)} \in \{0,4,4\}$.

In exemplary embodiments of the present invention, when the two sets of parameters for E-PDCCH candidates are set, the total number of E-PDCCH candidates is not changed or changed little (e.g., the unusable E-PDCCH candidates for a certain aggregate level are assigned to the other aggregate levels). Thus, the flexibility with which the base station transmits the E-PDCCH is increased and the possibility that the E-PDCCHs of different UEs block each other is reduced.

In a third exemplary sub-method, different parameters for E-PDCCH candidates are configured for different DCI formats in different subframes according to the number of REs which may be used for the E-PDCCH in each subframe and the number of bits of the DCI format.

For example, at least two sets of numbers of the E-PDCCH candidates for a different search space are configured, according to whether the E-PDCCH of a certain aggregate level may carry at least one DCI format to be transmitted. Thus, the set of the parameters for E-PDCCH candidates to be used may be obtained implicitly, according to the number of REs which may be used for the E-PDCCH in a subframe and the number of bits of the DCI format. Alternatively, if the DCI formats are grouped, the set of parameters for E-PDCCH candidates may be obtained implicitly for one subframe and one group of the DCI formats.

For example, an aggregate level of 1 is taken as a condition to configure at least two sets of numbers of E-PDCCH candidates.

When the E-PDCCH having an aggregate level of 1 may carry at least one DCI format, one set of numbers of E-PDCCH candidates is configured, e.g., the numbers of the E-PDCCH candidates of various aggregate levels in the search space are respectively configured as $M_E^{(1)} \in \{4,4,2\}$. The set of numbers of E-PDCCH candidates may apply to two cases. In a first case, the number of REs which may be used for the E-PDCCH is large, so that all of the possible DCI formats may be carried in one E-CCH. In a second case, one E-CCE in the subframe may carry some of the DCI formats, e.g., the fallback DCI format. If at least one DCI format may not be carried by the E-PDCCH having an aggregate level of 1, the other set of numbers of E-PDCCH candidates are configured, e.g., the numbers of the E-PDCCH candidates of various aggregate levels in the search space are respectively $M_E^{(2)} \in \{0,6,4\}$. The set of numbers of E-PDCCH candidates may also apply to two cases. In a first case, the number of REs which may be used for the E-PDCCH is small, thus, any DCI format may not be carried in one E-CCH. In a second case, one E-CCH in the subframe may not carry a part of the DCI formats, e.g., the DCI format of the downlink and uplink MIMO. In the above example, when the other set of numbers of E-PDCCH candidates are configured, the unusable E-PDCCH candidates of the aggregative level 1 are assigned respectively to the aggregate levels 2 and 4 to guarantee that the total number of the E-PDCCH candidates is not changed. Alternatively, other methods may be used, as long as the total number of E-PDCCH candidates is not changed or is changed little. For example, according to a rightward panning, the other set of numbers of E-PDCCH candidates are set as $M_E^{(1)} \in \{0,4,4\}$.

In exemplary embodiments of the present invention, when the two sets of the parameters for E-PDCCH candidates are set, the total number of E-PDCCH candidates is not changed or changed little (e.g., the unusable E-PDCCH candidates for a certain aggregate level are assigned to the other aggregate levels). Thus, the flexibility with which the base station transmits the E-PDCCH is increased and the possibility that the E-PDCCHs of different UEs block each other is reduced.

In a second exemplary method, a workable aggregate level is introduced.

The working aggregate level means that, for the number of REs for a certain E-CCE, if the E-PDCCH of one aggregate level may carry a certain DCI format, the aggregate level is the workable aggregate level for the DCI format. Herein, the condition in which the E-PDCCH of the aggregate level may carry the DCI format may be that in the aggregate level, an effective coding rate of the DCI format is less than a certain threshold value, e.g., 0.8 or 1. The threshold value may be pre-defined, or be transmitted by a broadcast signal or an RRC message.

Alternatively, the workable aggregate level may be defined for the subframe, i.e., the same definition is used for various DCI formats in one subframe. For example, according to the E-CCE definition, if the number of REs of the E-CCE in the subframe is large and one E-CCE may carry the E-PDCCH, the workable aggregate level which is uniformly defined for the subframe includes various aggregate levels started from the aggregate level which is 1, e.g., the aggregate level which is 1, 2, 4 or 8. If the number of REs of the E-CCE in the subframe is small, at least two E-CCEs are required to carry the E-PDCCH, the workable aggregate levels which are uniformly defined for the subframe are various aggregate levels started from the aggregate level which is 2, e.g., the aggregate level which is 2, 4, 8 or 16. Alternatively, if the number of REs of the E-CCE in the subframe is very small and two E-CCEs may not carry the E-PDCCH, it may be considered that the workable aggregate levels which are uniformly defined for the subframe include various levels started from the aggregate level which is 4 or higher, e.g., the aggregate level which is 4, 8, 16 or 32.

After the concept of the workable aggregate level is introduced, only a set of standard parameters for E-PDCCH candidates may be defined. By translating the set of the standard parameters for E-PDCCH candidates, the parameters for E-PDCCH candidates of the workable aggregate level are obtained. Determination of the numbers of E-PDCCH candidates of various aggregate levels is taken as an example. In an exemplary translation method, the number of E-PDCCH candidates of the aggregate level less than the minimal workable aggregate level is set as 0, or directly set as unusable, the number of E-PDCCH candidates of the minimal workable aggregate level is set as the first item of the number of the standard E-PDCCH candidates, the number of E-PDCCH candidates of the second minimal workable aggregate level is set as the second item of the number of the standard E-PDCCH candidates, and so on. The above exemplary translation method may apply to one DCI format, i.e., different DCI formats may have different workable aggregate levels, thus, may be configured with different parameters for E-PDCCH candidates. Also, the above exemplary translation method may apply to all of the DCI formats in one subframe, i.e., there are different workable aggregate levels in different subframes, thus, the different parameters for E-PDCCH candidates are configured to different subframes.

For example, if the number of E-PDCCH candidates in the parameters for E-PDCCH candidates is considered, a set of numbers of the standard E-PDCCH candidates is defined as $M_E \in \{4,4,2\}$.

An example of the method in which the workable aggregate level is defined for each DCI format is described as follows. If the E-PDCCH having an aggregate level of 1 may carry the DCI format, the minimal workable aggregate level is 1. Accordingly, the aggregate levels are $L_E \in \{1,2,4\}$, and the number of E-PDCCH candidates corresponding to the aggregate levels respectively are $M_E \in \{4,4,2\}$.

If the E-PDCCH having an aggregate level of 1 may not carry the DCI format, and the E-PDCCH having an aggregate level of 2 may carry the DCI format, the aggregate level of 2 is the minimal workable aggregate level. In that case, the aggregate levels are $L_E \in \{1,2,4\}$. The above numbers of standard E-PDCCH candidates are shifted rightward and the number of E-PDCCH candidates respectively corresponding to the aggregate levels are obtained respectively as $M_E \in \{0, 4,4\}$. In addition, if the number of REs of the E-CCE is small, the E-PDCCH having an aggregate level of 8 is allowed to be used. Thus, the aggregate levels are $L_E \in \{1, 2,4,8\}$, and the aggregate level of 2 is the minimal workable aggregate level. The number of E-PDCCH candidates is shifted rightward, and the number of E-PDCCH candidates respectively corresponding to the aggregate levels are obtained respectively as $M_E \in \{0,4,4,2\}$.

An example of the method in which the workable aggregate level is defined for the subframe is described as follows. If the number of REs of the E-CCE in the subframe is large, one E-CCE may carry the E-PDCCH, and the minimal workable aggregate level is 1 for the subframe. Thus, the aggregate levels are $L_E \in \{1,2,4\}$, and the number of E-PDCCH candidates corresponding to the aggregate levels respectively is $M_E \in \{4,4,2\}$.

If the number of REs of the E-CCE in the subframe is small, at least two E-CCEs may carry the E-PDCCH, and the minimal workable aggregate level is 2. Thus, the aggregate levels are $L_E \in \{1,2,4\}$, the number of the above standard E-PDCCH candidates is shifted rightward, and the number of E-PDCCH candidates respectively corresponding to the aggregate levels is obtained respectively as $M_E \in \{0,4,4\}$. In addition, if the number of REs of the E-CCE is small, the E-PDCCH having an aggregate level of 8 is allowed to be used, i.e., the aggregate levels are $L_E \in \{1,2,4,8\}$, the minimal workable aggregate level is 2, the number of alternative aggregate levels may be shifted rightward, and the number of E-PDCCH candidates respectively corresponding to the aggregate levels is obtained respectively as $M_E \in \{0,4,4,2\}$.

In the second exemplary method, only one set of parameters for E-PDCCH candidates is configured, yet the same effect as to configure multiple sets of the E-PDCCH parameters is reached as in the first exemplary method.

The exemplary parameters for E-PDCCH candidates described in the present invention may be configured by the RRC signal, thus, each UE may be configured respectively. Alternatively, the exemplary parameters for E-PDCCH candidates may be configured by the broadcast signal, thus, all of UEs in a cell are applicable. Alternatively, the parameters for E-PDCCH candidates may be pre-defined, e.g., in a specification.

Referring again to step 401, the localized E-PDCCH and the distributed E-PDCCH may be handled independently, i.e., variation of the number of REs of the PRB pair only impacts the number of E-PDCCH candidates in the search space of the localized E-PDCCH, and does not impact the number of E-PDCCH candidates in the search space of the distributed E-PDCCH. Alternatively, the variation of the number of REs of the PRB pair may impact both the localized E-PDCCH and the distributed E-PDCCH. For example, the variation of the number of REs of the PRB pair causes the variation of the number of E-PDCCH candidates in the search space of the localized E-PDCCH. Accordingly, the number of E-PDCCH candidates in the search space of the distributed E-PDCCH is varied. Thus, the total number of E-PDCCH candidates in the UE search space is not varied or is varied little.

For example, when the localized E-PDCCH having an aggregate level of 1 may carry at least one DCI format, one set of numbers of the localized E-PDCCH candidates and one set of numbers of the distributed E-PDCCH candidates are configured. For example, the number of various localized E-PDCCH candidates in the search space is configured as $M_{E,L}^{(1)} \in \{4,4,1\}$, and the number of various distributed E-PDCCH candidates in the search space is configured as $M_{E,D}^{(1)} \in \{2,2,1\}$.

If at least one DCI format may not be carried by the localized E-PDCCH having an aggregate level of 1, the other set of numbers of the localized E-PDCCH candidates and the other set of numbers of the distributed E-PDCCH candidates are configured. For example, the number of various localized E-PDCCH candidates in the search space is configured as $M_{E,L}^{(1)} \in \{0,4,1\}$, the number of various distributed E-PDCCH candidates in the search space is configured as $M_E^{(1)} \in \{6,2,1\}$.

In the above exemplary method in which two sets of E-PDCCH candidate parameters are configured, the number of the localized E-PDCCH candidates which may not work is assigned to the distributed E-PDCCH candidate corresponding to the same aggregate level. Alternatively, one part of the number of the localized E-PDCCH candidates which may not work is assigned to the other localized E-PDCCH candidates, the other part of the number of the localized E-PDCCH candidates which may not work is assigned to the distributed E-PDCCH candidates corresponding to the same and/or the different aggregate level.

For example, when the other set of the localized E-PDCCH candidates and the other set of the distributed E-PDCCH candidates are configured, the number of the localized E-PDCCH candidates of various aggregate levels in the search space is $M_{E,L}^{(1)} \in \{0,6,1\}$, and the number of the distributed E-PDCCH candidates of various aggregate levels in the search space is $M_{E,D}^{(1)} \in \{4,2,1\}$. In the above example, it is assumed that the total number of the localized E-PDCCH candidates and distributed E-PDCCH candidates in the two sets of the parameters are equal. Of course, it is to be understood that the present invention is not so limited in that the total number of the localized E-PDCCH candidates and distributed E-PDCCH candidates in the two sets of the parameters need not be equal.

Exemplary embodiments of the present invention also provide a user equipment and a base station.

Figure 5:
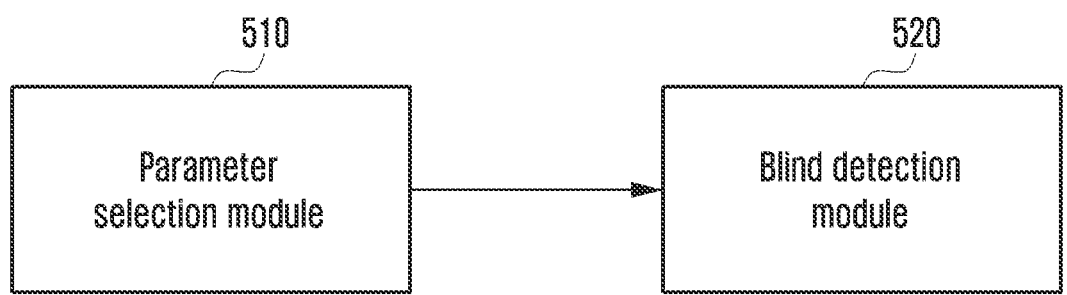
FIG. 5 is a schematic diagram illustrating a structure of a user equipment according to an exemplary embodiment of the present invention.

FIG. 5 is a schematic diagram illustrating a structure of a user equipment according to an exemplary embodiment of the present invention.

Referring to FIG. 5, the user equipment includes a parameter selection module 510 and a blind detection module 520.

The parameter selection module 510 is adapted to determine the parameters for E-PDCCH candidates according to a current downlink subframe and a detected DCI format.

The blind detection module 520 is adapted to blindly detect an E-PDCCH in an E-PDCCH search space corresponding to the parameters for E-PDCCH candidates determined by the parameter selection module.

Figure 6:
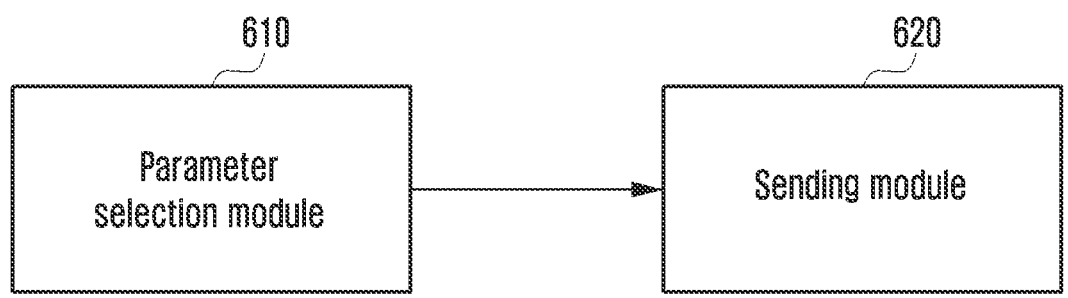
FIG. 6 is a schematic diagram illustrating a structure of a base station according to an exemplary embodiment of the present invention.

FIG. 6 is a schematic diagram illustrating a structure of a base station according to an exemplary embodiment of the present invention.

Referring to FIG. 6, the base station includes a parameter selection module 610 and a sending module 620.

The parameter selection module 610 is adapted to determine the parameters for E-PDCCH candidates according to a current downlink subframe and a detected DCI format.

The sending module 620 is adapted to select an E-PDCCH candidate in an E-PDCCH search space corresponding to the parameters for E-PDCCH candidates selected by the parameter selection module, and to send downlink control information.

While the invention has been shown and described with reference to certain exemplary embodiments thereof, it will be understood by those skilled in the art that various changes in form and details may be made therein without departing from the spirit and scope of the of the invention as defined by the appended claims and their equivalents.

What is claimed is:

1. A method by a terminal in a wireless communication system, the method comprising:
   identifying a downlink control information (DCI) format for an enhanced physical downlink control channel (E-PDCCH);
   identifying a quantity of E-PDCCH candidates of each of aggregation levels based on whether the identified DCI format is included in a predefined group of DCI format; and
   receiving downlink control information by monitoring the E-PDCCH candidates in an E-PDCCH search space, wherein the E-PDCCH search space is determined based on the identified quantity of E-PDCCH candidates.

2. The method of claim 1, wherein the quantity of E-PDCCH candidates is identified based on the identified DCI format and a quantity of resource elements (REs) in a physical resource block (PRB) pair for the E-PDCCH.

3. The method of claim 1, further comprising:
   identifying whether the DCI format is included in a first group of DCI format or a second group of DCI format, wherein a number of bits of control information associated with the first group of DCI format is more than a number of bits of control information associated with the second group of DCI format.

4. The method of claim 1, wherein a number of bits of control information associated with each of DCI formats is different from each other.

5. The method of claim 2, wherein the quantity of REs in the PRB pair is calculated based on a quantity of REs for a common reference signal (CRS) and a channel state information reference signal (CSI-RS) in the PRB pair configured for the E-PDCCH.

6. The method of claim 1, further comprising:
receiving information indicating whether the terminal monitors the E-PDCCH via a higher layer signaling.

7. The method of claim 2, wherein the quantity of E-PDCCH candidates is identified based on a downlink subframe type, the quantity of REs, and the DCI format.

8. A terminal in a wireless communication system, the terminal comprising:
a transceiver configured to transmit and receive a signal; and
a controller configured to:
identify a downlink control information (DCI) format for an enhanced physical downlink control channel (E-PDCCH),
identify a quantity of E-PDCCH candidates of each of aggregation levels based on whether the identified DCI format is included in a predefined group of DCI format, and
receive downlink control information by monitoring the E-PDCCH candidates in an E-PDCCH search space,
wherein the E-PDCCH search space is determined based on the identified quantity of E-PDCCH candidates.

9. The terminal of claim 8, wherein the quantity of E-PDCCH candidates is identified based on the identified DCI format and a quantity of resource elements (REs) in a physical resource block (PRB) pair for the E-PDCCH.

10. The terminal of claim 8,
wherein the controller is further configured to identify whether the DCI format is included in a first group of DCI format or a second group of DCI format, and
wherein a number of bits of control information associated with the first group of DCI format is more than a number of bits of control information associated with the second group of DCI format.

11. The terminal of claim 8, wherein a number of bits of control information associated with each of DCI formats is different from each other.

12. The terminal of claim 9, wherein the quantity of REs in the PRB pair is calculated based on a quantity of REs for a common reference signal (CRS) and a channel state information reference signal (CSI-RS) in the PRB pair configured for the E-PDCCH.

13. The terminal of claim 8, wherein the controller is further configured to receive information indicating whether the terminal monitors the E-PDCCH via a higher layer signaling.

14. The terminal of claim 9, wherein the quantity of E-PDCCH candidates is identified based on a downlink subframe type, the quantity of REs, and the DCI format.

15. A method by a base station in a wireless communication system, the method comprising:
identifying a downlink control information (DCI) format for an enhanced physical downlink control channel (E-PDCCH);
identifying a quantity of E-PDCCH candidates of each of aggregation levels based on whether the identified DCI format is included in a predefined group of DCI format;
selecting the E-PDCCH candidate in an E-PDCCH search space that is determined based on the quantity of E-PDCCH candidates; and
transmitting the E-PDCCH using resources corresponding to the selected E-PDCCH candidate.

16. The method of claim 15, wherein the quantity of E-PDCCH candidates is identified based on the identified DCI format and a quantity of resource elements (REs) in a physical resource block (PRB) pair for the E-PDCCH.

17. The method of claim 15, further comprising:
identifying whether the DCI format is included in a first group of DCI format or a second group of DCI format,
wherein a number of bits of control information associated with the first group of DCI format is more than a number of bits of control information associated with the second group of DCI format.

18. The method of claim 15, wherein a number of bits of control information associated with each of DCI formats is different from each other.

19. The method of claim 16, wherein the quantity of REs in the PRB pair is calculated based on a quantity of REs for a common reference signal (CRS) and a channel state information reference signal (CSI-RS) in the PRB pair configured for the E-PDCCH.

20. The method of claim 15, further comprising:
transmitting information indicating whether the terminal monitors the E-PDCCH via a higher layer signaling.

21. The method of claim 16, wherein the quantity of E-PDCCH candidates is identified based on a downlink subframe type, the quantity of REs, and the DCI format.

22. A base station in a wireless communication system, the base station comprising:
a controller configured to transmit and receive a signal; and
a controller configured to:
identify a downlink control information (DCI) format for an enhanced physical downlink control channel (E-PDCCH),
identify a quantity of E-PDCCH candidates of each of aggregation levels based on whether the identified DCI format is included in a predefined group of DCI format,
select the E-PDCCH candidate in an E-PDCCH search space that is determined based on the quantity of E-PDCCH candidates, and
transmit the E-PDCCH using resources corresponding to the selected E-PDCCH candidate.

23. The base station of claim 22, wherein the quantity of E-PDCCH candidates is identified based on the identified DCI format and a quantity of resource elements (REs) in a physical resource block (PRB) pair for the E-PDCCH.

24. The base station of claim 22,
wherein the controller is further configured to identify whether the DCI format is included in a first group of DCI format or a second group of DCI format, and
wherein a number of bits of control information associated with the first group of DCI format is more than a number of bits of control information associated with the second group of DCI format.

25. The base station of claim 22, wherein a number of bits of control information associated with each of DCI formats is different from each other.

26. The base station of claim 23, wherein the quantity of REs in the PRB pair is calculated based on a quantity of REs for a common reference signal (CRS) and a channel state information reference signal (CSI-RS) in the PRB pair configured for the E-PDCCH.

27. The base station of claim 22, wherein the controller is further configured to transmit information indicating whether the terminal monitors the E-PDCCH via a higher layer signaling.

28. The base station of claim 23, wherein the quantity of E-PDCCH candidates is identified based on a downlink subframe type, the quantity of REs, and the DCI format.

\* \* \* \* \*